United States Patent
Yang et al.

(10) Patent No.: US 9,774,367 B2
(45) Date of Patent: Sep. 26, 2017

(54) METHOD FOR AUTOMATICALLY REMOVING CROSSTALK AND AN APPARATUS THEREOF

(71) Applicant: Arcadyan Technology Corp., Hsinchu (TW)

(72) Inventors: Yu-Shuang Yang, Hsinchu (TW); Yu-Hsin Chang, Hsinchu (TW)

(73) Assignee: ARCADYAN TECHNOLOGY CORP., Hsinchu (TW)

( * ) Notice: Subject to any disclaimer, the term of this patent is extended or adjusted under 35 U.S.C. 154(b) by 0 days.

(21) Appl. No.: 15/404,727

(22) Filed: Jan. 12, 2017

(65) Prior Publication Data

US 2017/0201292 A1     Jul. 13, 2017

Related U.S. Application Data

(60) Provisional application No. 62/277,663, filed on Jan. 12, 2016.

(51) Int. Cl.

| | |
|---|---|
| H04B 15/00 | (2006.01) |
| H04N 11/02 | (2006.01) |
| H03D 1/00 | (2006.01) |
| H04J 1/12 | (2006.01) |
| H04B 3/32 | (2006.01) |
| H04L 12/28 | (2006.01) |

(Continued)

(52) U.S. Cl.
CPC .............. *H04B 3/32* (2013.01); *H04B 3/487* (2015.01); *H04L 12/2878* (2013.01); *H04M 3/30* (2013.01)

(58) Field of Classification Search
USPC ....... 375/211, 213, 216, 219, 220, 221, 222, 375/240, 240.26–240.27, 240.29, 242, 375/271, 278, 285, 284, 295, 316, 317, 375/340, 342, 346, 344, 347, 348; 370/201
See application file for complete search history.

(56) References Cited

U.S. PATENT DOCUMENTS

2007/0258527 A1* 11/2007 Simileysky ........... H04L 1/0002
                                                                                375/260
2009/0060013 A1* 3/2009 Ashikhmin .............. H04B 3/32
                                                                                375/222

(Continued)

OTHER PUBLICATIONS

European Patent Office, European Search Report and Annex to the European Search Report on European Patent Application No. EP 17 15 1237, pp. (1-9), dated Feb. 27, 2017.

*Primary Examiner* — Linda Wong
(74) *Attorney, Agent, or Firm* — Gottlieb, Rackman & Reisman, P.C.

(57) ABSTRACT

The present invention discloses a method and an apparatus to automatically remove crosstalk, which can automatically determine and set the start frequency in the G.fast system without unnecessary manual operation to automatically remove crosstalk interference between VDSL and G.fast. The present invention allows the time required to complete the setting of the start frequency in the G.fast system corresponding to each port of a unit of DPU/DSLAM equipment and the related work therefor to be reduced to less than 2 minutes. Therefore, the installation time is greatly reduced, human errors are also reduced, and the installation can be done correctly by ordinary technicians, which is advantageous to the promotion of G.fast systems.

20 Claims, 8 Drawing Sheets

(51) Int. Cl.
*H04B 3/487* (2015.01)
*H04M 3/30* (2006.01)

(56) References Cited

U.S. PATENT DOCUMENTS

| | | | |
|---|---|---|---|
| 2012/0243588 A1* | 9/2012 | Shi | H04B 3/32 |
| | | | 375/219 |
| 2014/0153629 A1* | 6/2014 | Gao | H04M 11/062 |
| | | | 375/227 |
| 2015/0365131 A1* | 12/2015 | Chang | H04B 3/32 |
| | | | 370/201 |
| 2016/0049990 A1* | 2/2016 | Lv | H04B 3/32 |
| | | | 370/201 |
| 2017/0077988 A1* | 3/2017 | Flask | H04L 1/203 |
| 2017/0118350 A1* | 4/2017 | Linney | H04M 11/062 |

\* cited by examiner

METHOD FOR AUTOMATICALLY REMOVING CROSSTALK AND AN APPARATUS THEREOF

CROSS-REFERENCE TO RELATED APPLICATION AND CLAIM OF PRIORITY

This application claims the benefit of U.S. Provisional Application No. 62/277,663, filed on Jan. 12, 2016, at the United States Patent and Trademark Office, the disclosures of which are incorporated herein in their entirety by reference.

FIELD OF THE INVENTION

The invention is related to a method and an apparatus for automatically removing crosstalk, and more particularly to a method and an apparatus for automatically removing crosstalk between a very-high-bit-rate digital subscriber line (VDSL) and a fast access to subscriber terminals (G.fast) system on a bundle of wires.

BACKGROUND OF THE INVENTION

G.fast is an ITU (International Telecommunication Union) DSL (digital subscriber line) standard, providing ultra-high-speed broadband network transmission. The service distance of G.fast is within 300 m, which provides a solution to the last mile problem for broadband networks. Therefore, in places where optical fiber deployment is difficult and copper wires are used to connect residences, G.fast can achieve ultra high bandwidth and speed. For example, the network transmission speed of the copper telephone wire in an old traditional building can be increased up to 1 Gbps. The usage of the G.fast system does not require rewiring in the entire building or homes. Thus, the most expensive and time-consuming process for connecting the optical fiber to residences can be eliminated. At the same time, the digital subscriber line access multiplexer (DSLAM) of VDSL is already installed widely in the field as an existing broadband service to provide transmission speeds of up to 100 Mbps. A telecommunications company may use the same bundle of wires for G.fast service, but crosstalk occurs when G.fast and VDSL services both use the same bundle of wires.

Please refer to FIG. 1, which is an installation scenario for installing VDSL and G.fast on the same bundle of wires. FIG. 1 shows G.fast distribution point unit (DPU)/DSLAM equipment 101 which has many ports. Some of the ports of G.fast DPU/DSLAM equipment 101 (3 ports are shown in FIG. 1) are each connected to an individual unit of G.fast customer premises equipment (CPE) 103. The other side of G.fast DPU/DSLAM equipment 101 is connected to an optical fiber or an optical line terminal (OLT) 105, and to the Internet 106, a video on demand server 107 and an element management system (EMS) server 108 through the optical fiber or the optical line terminal (OLT) 105. Each of the ports of G.fast DPU/DSLAM equipment 101 is connected to an individual unit of G.fast CPE 103 through a telephone line (where each telephone line consists of a pair of copper wires) 109-1, 109-2 or 109-3. A bundle of wires is already installed, and the bundle of wires includes many telephone lines wrapped up together. For example, the DSLAM 102 of VDSL and CPE 104 of VDSL are connected by a telephone line 109-n in the bundle of wires. The telephone lines 109-1, 109-2 and 109-3 for the G.fast system, and the telephone line 109-n for VDSL are all part of the bundle of wires.

If VDSL and G.fast are installed through the same DSLAM, near end crosstalk (NEXT) and far end crosstalk (FEXT) vectoring technologies can be used to solve the crosstalk interference issue. But if G.fast is installed after VDSL, the DSLAMs will be different, and these vectoring technologies cannot remove the crosstalk.

In addition, because G.fast DPU/DSLAM equipment is typically installed after the installation of VDSL service, it is mandatory to remove crosstalk between VDSL and G.fast when G.fast DPU/DSLAM equipment is installed. The maximum aggregate transmit power for G.fast is 4 dBm and this is lower than that of existing VDSL technology. As a result, G.fast suffers enormous interference from various types of VDSLs. VDSL can cause speed drops, packet loss, and even worse, causing the G.fast link to go down.

G.fast has two profiles corresponding to bandwidths (maximum frequencies) of 106 MHz and 212 MHz. VDSL has many profiles, e.g. 8a, 8b, 8c, 8d, 12a, 12b, 17a and 30a, each with its own bandwidth. Among them, 30a has the largest bandwidth (highest maximum frequency) of 30 MHz. The existing VDSL service on the bundle of wires may include one or more of the profiles above. ITU Recommendation ITU-T G.9700 requires that the G.fast system be equipped with a set of tools called a power spectral density (PSD) mask, which can be configured to deal with the problem of crosstalk interference between VDSL and G.fast. For example, a PSD mask can be configured to set a start frequency in the G.fast system so that the frequency range of the G.fast system lies outside those of all the existing VDSLs on the bundle of wires which cause crosstalk, thus removing crosstalk automatically. The set of tools can also be used to set a minimum G.fast frequency, e.g., 2.2 MHz.

For the convenience of the installation technician who configures the start frequency in the G.fast system corresponding to each port of G.fast DPU/DSLAM equipment, the G.fast DPU/DSLAM equipment manufacturer usually provides G.fast DPU/DSLAM equipment with the following functions: measuring a type of loop diagnostic metric data related to a communication loop connected between a port of G.fast DPU/DSLAM equipment and CPE, e.g., signal-to-noise ratio (SNR), and showing the loop diagnostic metric data to the installation technician so he can determine the start frequency in the G.fast system corresponding to the port. Therefore, the installation technician has to be able to read the loop diagnostic metric data, determine the start frequency in the G.fast system, and set the start frequency using his knowledge of the G.fast system and equipment. However, typical installation technicians do not have these abilities. Experienced technicians with these abilities have to be dispatched, leading to high operation cost. However, even for experienced technicians with these abilities, to manually complete all the work related to setting the start frequency in the G.fast system corresponding to one port, approximately one to two hours are needed. To install one unit of G.fast DPU/DSLAM equipment usually means setting the start frequencies in the G.fast system corresponding to multiple ports plus related work including testing, which causes the average installation time of a unit of G.fast DPU/DSLAM equipment to be about two days. The lengthy installation time is detrimental to the promotion of G.fast, not to mention that manual operations may introduce misjudgments, e.g., in determining the start frequency in the G.fast system, or in setting the start frequency. Therefore, an invention which can greatly speed up the installation time and facilitate the correct installation by typical installation technicians is urgently needed.

In order to overcome the drawbacks in the prior art, a method and an apparatus for automatically removing crosstalk is disclosed.

SUMMARY OF THE INVENTION

The present invention discloses a method and an apparatus to automatically remove crosstalk, which can automatically determine and set the start frequency in the G.fast system without unnecessary manual operation to automatically remove crosstalk interference between VDSL and G.fast. The present invention allows the time required to complete the setting of the start frequency in the G.fast system corresponding to each port of a unit of DPU/DSLAM equipment and the related work therefor to be reduced to less than 2 minutes. Therefore, the installation time is greatly reduced, human errors are also reduced, and the installation can be done correctly by ordinary technicians, which is advantageous to the promotion of G.fast systems. Thus, the present invention has utility for the industry and significant practical applications.

In accordance with one aspect of the present invention, a method to automatically remove crosstalk between VDSL and a G.fast system on a bundle of wires is disclosed, and the method includes: measuring a plurality of loop diagnostic metric data related to a communication loop connected between G.fast DPU/DSLAM equipment and G.fast customer premises equipment (CPE) by the G.fast DPU/DSLAM equipment; simulating a loop diagnostic metric simulation graph having plural graph points and related to the communication loop in the absence of VDSL; setting a start point for scanning the loop diagnostic metric data, wherein the start point has a start scan index corresponding to a first G.fast subcarrier having a frequency being the sum of a maximum VDSL frequency causing the crosstalk and a guard band; scanning at a plurality of scan points from the start point down to a stop point having a stop scan index corresponding to a second G.fast subcarrier, wherein the second G.fast subcarrier has a minimum G.fast frequency, the plurality of scan points including the start point and the stop point have a plurality of scan indexes including the start scan index and the stop scan index and corresponding to a plurality of G.fast subcarriers including the first and the second subcarriers, and a specific one of the loop diagnostic metric data corresponds to a specific one of the plural graph points and a specific one of the plural graph points corresponds to a specific one of the plurality of subcarriers; comparing the specific one of the loop diagnostic metric data and the specific graph point corresponding to the specific subcarrier to obtain a difference; and when the difference complies with a degradation criterion of communication data flow quality, determining the start frequency of the communication loop in the G.fast system based on the specific scan index and stopping the scanning step, wherein the degradation criterion of communication data flow quality is established based on sudden degradation resulting in at least one of a non-sustained link and a packet loss in a specific G.fast subcarrier having the specific scan index.

In accordance with a further aspect of the present invention, a method of operating an access equipment is disclosed, and the method includes: obtaining a plurality of loop diagnostic metric data related to a communication loop connected between CPE and one of the access equipment and another access equipment; and removing crosstalk between VDSL and a transmission line on a bundle of wires, wherein the transmission line transmits a signal using a plurality of subcarriers including a first subcarrier having a minimum frequency, and the removing step further includes: setting a start point for scanning the loop diagnostic metric data, wherein the start point has a start scan index corresponding to a second subcarrier having a frequency being the sum of a maximum VDSL frequency causing the crosstalk and a guard band; scanning at a plurality of scan points from the start point down to a stop point having a stop scan index corresponding to the first subcarrier, wherein the plurality of scan points including the start point and the stop point have a plurality of scan indexes including the start scan index and the stop scan index and corresponding to the plurality of subcarriers including the first and the second subcarriers; and when a specific one of the loop diagnostic metric data complies with a degradation criterion of communication data flow quality, determining the start frequency of the communication loop in the transmission line based on a specific one of the scan indexes and stopping the scanning step, wherein the degradation criterion of communication data flow quality is established based on sudden degradation resulting in at least one of a non-sustained link and a packet loss in a specific subcarrier having the specific scan index.

In accordance with another aspect of the present invention, a unit of access equipment is disclosed, and the access equipment includes: a crosstalk removal module removing crosstalk between VDSL and a transmission line, wherein the transmission line transmits a signal using a plurality of subcarriers including a first subcarrier having a minimum frequency; and a processor, wherein the processor executes the crosstalk removal module and performs steps of: setting a start point for scanning a plurality of loop diagnostic metric data related to a communication loop, wherein the communication loop is connected between CPE and one of the access equipment and another access equipment, the start point has a start scan index corresponding to a second subcarrier having a frequency being the sum of a maximum VDSL frequency causing the crosstalk and a guard band; scanning at a plurality of scan points from the start point down to a stop point having a stop scan index corresponding to the first subcarrier, wherein the plurality of scan points including the start point and the stop point have a plurality of scan indexes including the start scan index and the stop scan index and corresponding to the plurality of subcarriers including the first and the second subcarriers; and when a specific one of the loop diagnostic metric data complies with a degradation criterion of communication data flow quality, determining the start frequency of the communication loop in the transmission line based on a specific one of the scan indexes and stopping the scanning step, wherein the degradation criterion of communication data flow quality is established based on sudden degradation resulting in at least one of a non-sustained link and a packet loss in a specific subcarrier having the specific scan index.

BRIEF DESCRIPTION OF THE DRAWINGS

The details and advantages of the present invention will become more readily apparent to those ordinarily skilled in the art after reviewing the following detailed descriptions and accompanying drawings.

DETAILED DESCRIPTION OF THE PREFERRED EMBODIMENT

Figure 1:
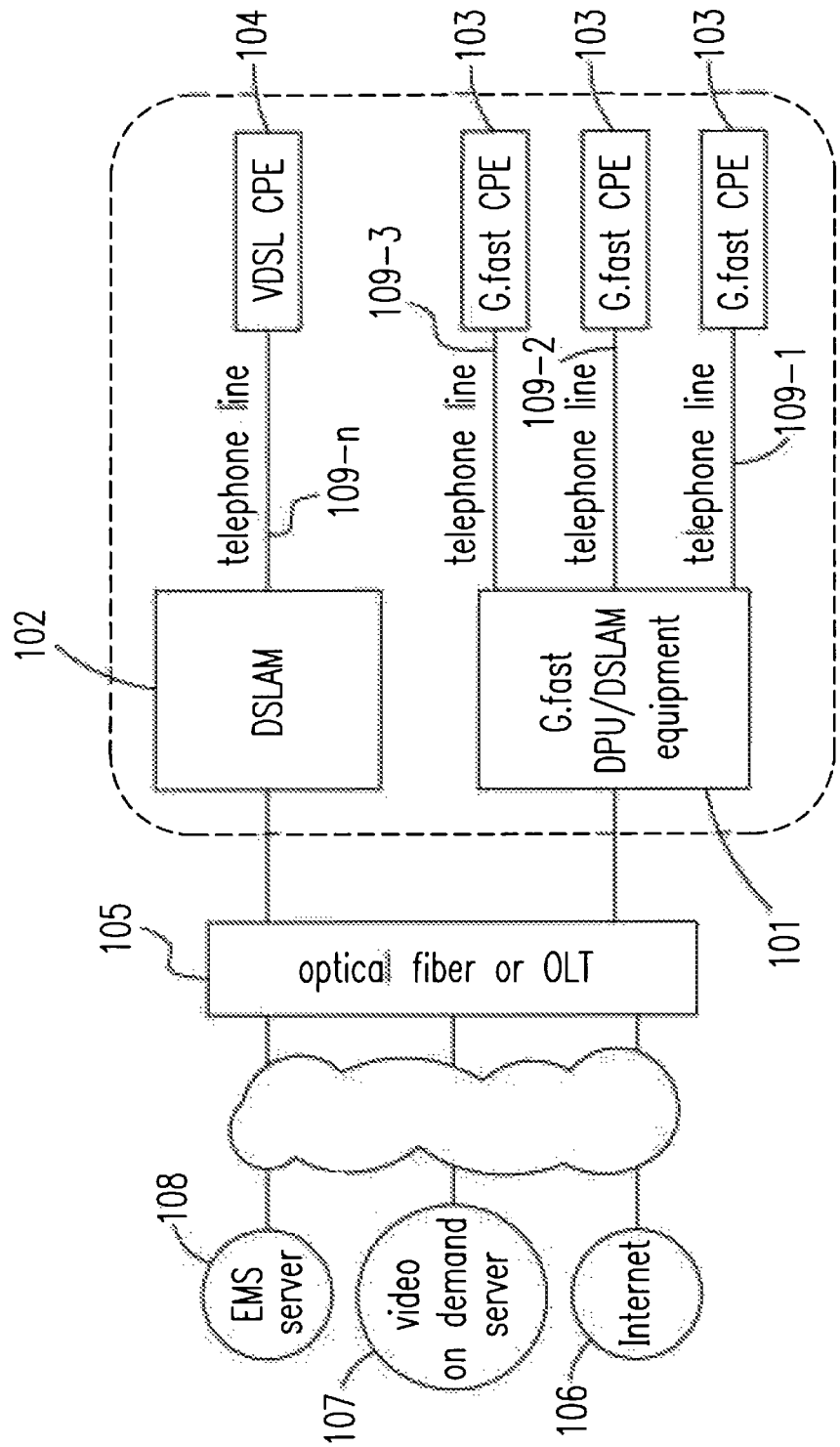
FIG. 1 is an installation scenario for VDSL and G.fast on the same bundle of wires.
Figure 2:
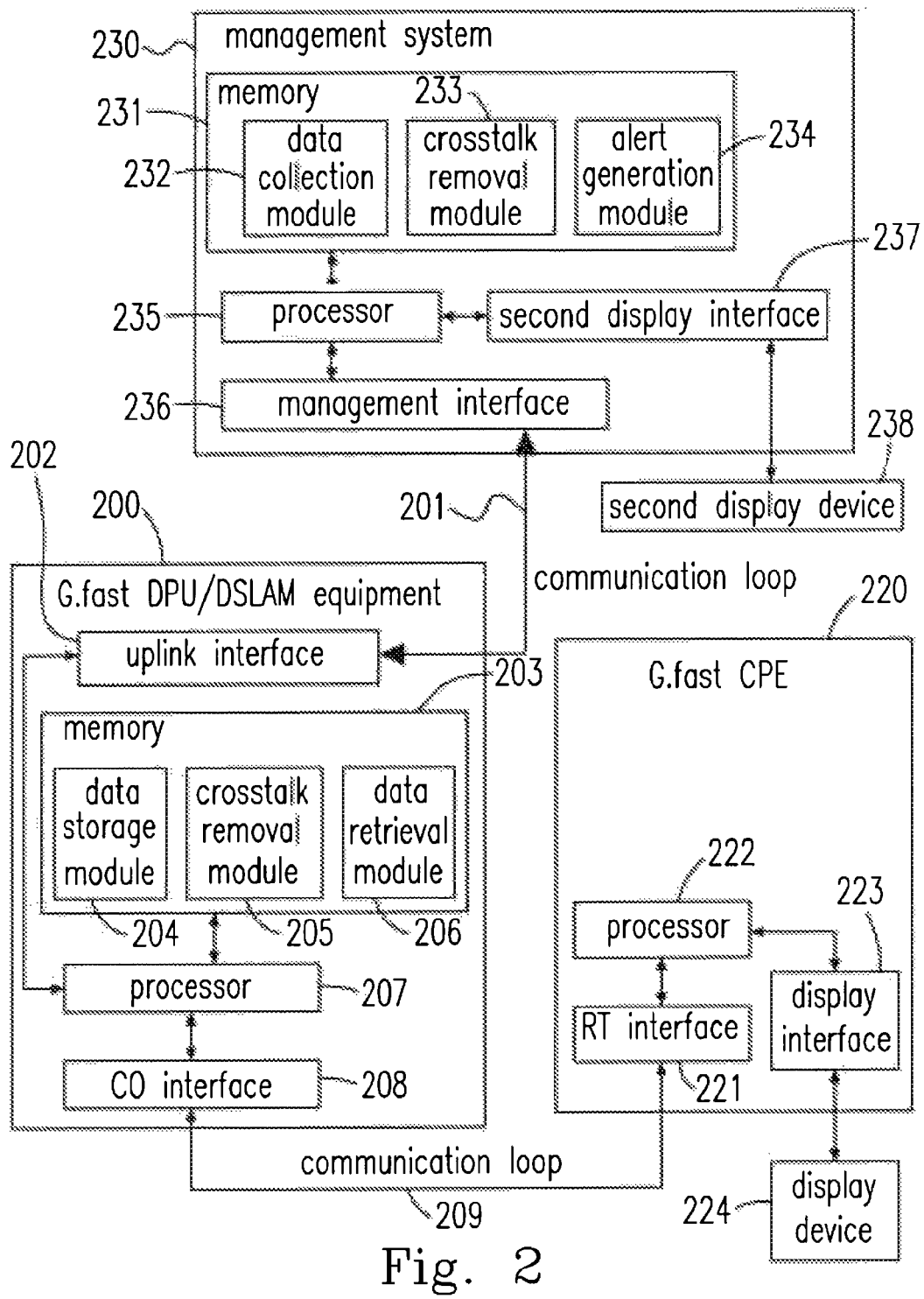
FIG. 2 shows a block diagram of an embodiment of the apparatus of the present invention which removes crosstalk automatically.

Please refer to FIG. 2, which shows the block diagram of an embodiment of the apparatus of the present invention which removes crosstalk automatically. In FIG. 2, G.fast DPU/DSLAM equipment 200 can automatically determine the start frequency of the communication loop 209 in the G.fast system to remove crosstalk from VDSL. The communication loop 209 is connected between a port of G.fast DPU/DSLAM equipment 200 and CPE 220. The management system 230 is connected with one or multiple units of G.fast DPU/DSLAM equipment 200, while a unit of G.fast DPU/DSLAM equipment 200 is connected with one or multiple units of G.fast CPE 220. The communication loop 209 may be a communication link to a central office (CO), a dwelling, a basement or to access to a wide area network or any combination thereof. In one embodiment, the communication loop 209 provides a broadband communication path, including upstream and downstream channels, and G.fast CPE 220 is a G.fast digital subscriber line modem or an Integrated Access Device (IAD) with G.fast features. In another embodiment, the broadband communication path carries video and audio data, and G.fast CPE 220 can be a set-top box that provides a broadband connection to transmit the video and audio data to a display device 224 such as a television through a display interface 223. The display interface 223 can be an internet access interface or a VoIP interface for data access.

In the embodiment shown in FIG. 2, G.fast DPU/DSLAM equipment 200 includes a memory 203 and a mutually connected processor 207. The processor 207 is also connected to a CO interface 208 and an uplink interface 202. The memory 203 stores a crosstalk removal module 205 to automatically remove crosstalk between VDSL and G.fast on the communication loop 209, and stores information related to the automatic removal of crosstalk. In other words, the memory 203 includes instructions executable by the processor 207 to perform the steps of a method to determine the start frequency in the G.fast system (the method will be described in more detail later). The memory 203 includes a data retrieval module 206, the crosstalk removal module 205 and a data storage module 204. The processor 207 can execute the data retrieval module 206 to process the measurement of loop diagnostic metric data related to the communication loop 209. The loop diagnostic metric data can be signal-to-noise ratios (SNR), quiet line noise, HLog, other loop performance parameters or a combination thereof. The processor 207 can execute the crosstalk removal module 205 to determine the start frequency in the G.fast system. When determining the start frequency, a scan of the loop diagnostic metric data is done. The loop diagnostic metric datum is a function of the G.fast subcarrier (Cf. FIGS. 4-7). The scan starts from a G.fast subcarrier of a higher frequency, and moves sequentially down to a G.fast subcarrier of a lower frequency. During the scan, when a specific one of the loop diagnostic metric data complies with a degradation criterion of communication data flow quality, the start frequency of the communication loop 209 in the G.fast system is determined to remove crosstalk from VDSL. The degradation criterion of communication data flow quality is established based on sudden degradation resulting in at least one of a non-sustained link and a packet loss in a specific G.fast subcarrier, and can be adjusted according to the type of loop diagnostic metric data. The loop diagnostic metric data can be measured from a downstream or an upstream channel. The processor 207 can also execute the crosstalk removal module 205 to simulate a loop diagnostic metric simulation graph related to the communication loop 209 in the absence of VDSL. The loop diagnostic metric simulation graph is driven from the real measurement of the loop conditions. By comparing a specific one of the loop diagnostic metric data and a specific graph point on the loop diagnostic metric simulation graph which both correspond to a specific subcarrier, it may be easier to judge whether the specific one of the loop diagnostic metric data shows that crosstalk is causing a non-sustained link or a packet loss.

After the start frequency of the communication loop 209 in the G.fast system is set and crosstalk from VDSL is automatically removed, run time noise can be handled with the functions of the G.fast system specified by ITU Recommendation ITU-T G.9701: fast rate adaptation (FRA) and seamless rate adaptation (SRA), through determining a G.fast run time dynamic bit swap by FRA and SRA. The data storage module 204 can be used to store information such as the loop diagnostic metric data, the loop diagnostic metric simulation graph, the start frequency in the G.fast system and the G.fast run time dynamic bit swap. In one embodiment, G.fast DPU/DSLAM equipment 200 may communicate data related to the determination of the start frequency in the G.fast system to remove crosstalk automatically to the management system 230.

G.fast CPE 220 includes a remote terminal (RT) interface 221 that facilitates communications between G.fast CPE 220 and the communication loop 209. G.fast CPE 220 also includes a processor 222 that is coupled to the RT interface 221. G.fast CPE 220 may include the display interface 223 and is connected to the display device 224; when crosstalk causes packet losses, the display device 224 will show a mosaic.

The management system 230 in FIG. 2 includes a management interface 236 that facilitates communications between the management system 230 and the uplink interface 202 of G.fast DPU/DSLAM equipment 200 via a communication loop 201. The management system 230 also includes a memory 231 and a mutually connected processor 235. The processor 235 is also coupled to a management interface 236. The memory 231 stores a crosstalk removal module 233 to automatically remove crosstalk between VDSL and G.fast on the communication loop 209, and stores information related to the automatic removal of crosstalk. The memory 231 includes a data collection module 232, the crosstalk removal module 233 and an alert generation module 234. The processor 235 can execute the data collection module 232 to obtain the loop diagnostic metric data related to G.fast DPU/DSLAM equipment 200. In general, the loop diagnostic metric data can be collected from G.fast DPU/DSLAM equipment 200, or obtained from the data collection module 232, which stores the loop diagnostic metric data collected from G.fast DPU/DSLAM equipment 200. The data collection module 232 also includes a database. In one embodiment, the management system 230 can include multiple servers, and multiple processors 235 may be distributed among the multiple servers, either working independently to access data or distributed redundantly to provide processing or compensate for database faults. In another embodiment, the management system 230 can be a single server and the processor 235 can include a single processor. In another embodiment, the processor 235 can execute the data collection module 232 to generate a request for the loop diagnostic metric data, which can be sent to G.fast DPU/DSLAM equipment 200 via the communication loop 201. The data collection module 232 may also receive the loop diagnostic metric data from G.fast DPU/DSLAM equipment 200 in response to the request. In another embodiment, the processor 235 can execute the data collection module 232 to generate a query to the database in the data collection module 232. The database stores the loop diagnostic metric data related to G.fast DPU/DSLAM equipment 200, and the data collection module 232 is utilized to receive the loop diagnostic metric data from the database in response to the query.

After the loop diagnostic metric data related to the communication loop 209 are received, the processor 235 can execute the crosstalk removal module 233 to determine the start frequency of the communication loop 209 in the G.fast system. The processor 235 can also be connected to a second display interface 237. The second display interface 237 can be connected to a second display device 238. The processor 235 can also execute the alert generation module 234, and send the loop diagnostic metric data, the start frequency in the G.fast system and data related to the G.fast run time dynamic bit swap through the second display interface 237 to the second display device 238 to report this information to an operator. The embodiment of the second display interface 237 includes a craft interface or a telnet interface. The embodiment of the second display device 238 includes a personal computer or a terminal Generally speaking, a crosstalk removal module is located in a unit of access equipment, e.g., DPU/DSLAM equipment or a management system, to remove crosstalk between VDSL and a transmission line on the same bundle of wires. The transmission line can be a G.fast system or other transmission lines with features similar to those of a G.fast system.

Figure 3A:
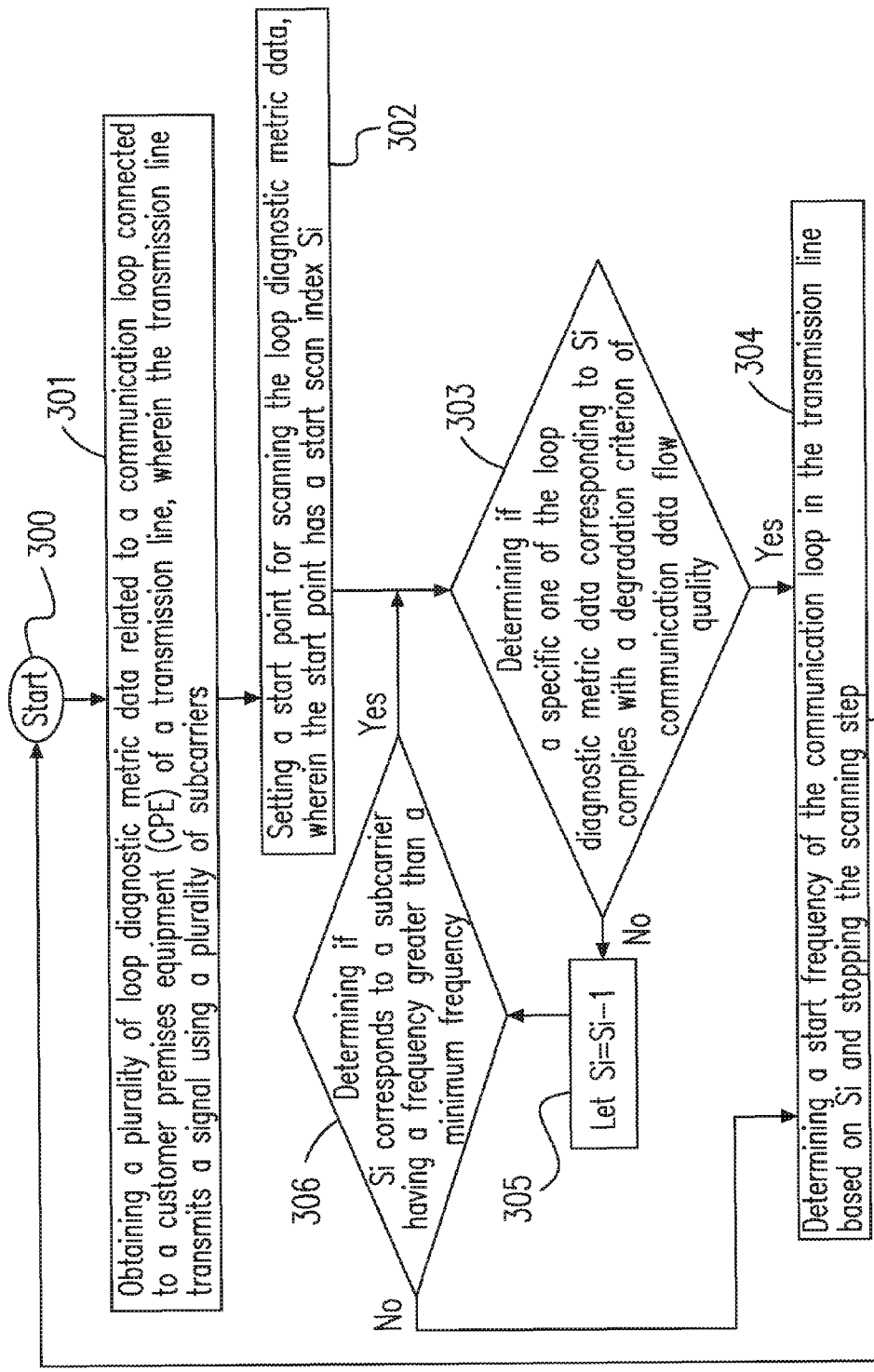
FIGS. 3A and 3B together show the flow chart of an embodiment of the method of the present invention which removes crosstalk automatically.
Figure 3B:
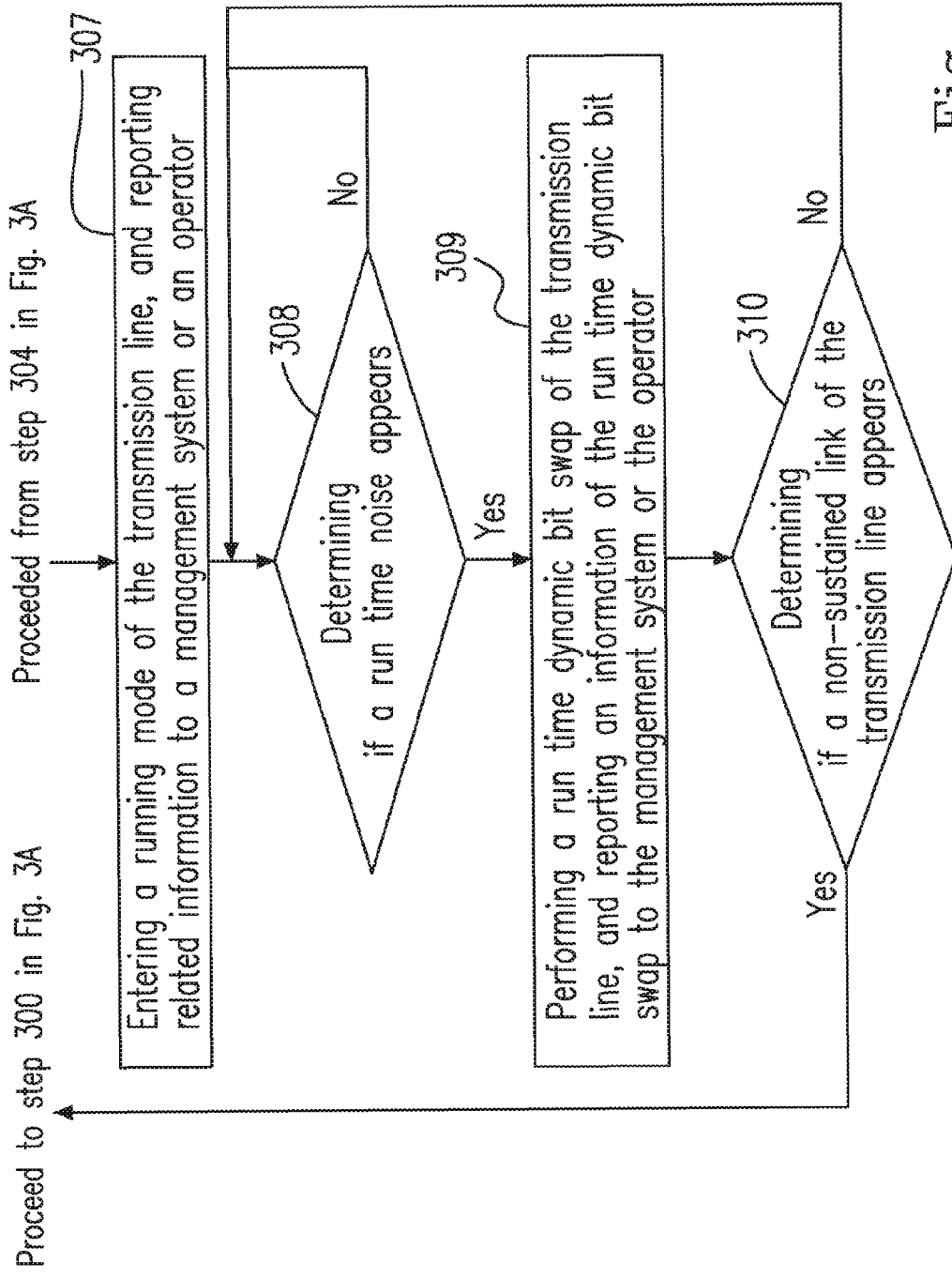

Please refer to FIGS. 3A and 3B, which together show the flow chart of an embodiment of the method of the present invention that removes crosstalk automatically. The method removes crosstalk between VDSL and a transmission line on the same bundle of wires. The method starts at step 300 in FIG. 3A. In step 301, a plurality of loop diagnostic metric data related to a communication loop connected to a CPE of a transmission line are obtained, wherein the transmission line transmits a signal using a plurality of subcarriers. Step 301 may also include obtaining a loop diagnostic metric simulation graph related to the communication loop in an absence of the VDSL. The plurality of loop diagnostic metric data and the loop diagnostic metric simulation graph may be obtained from the CPE, from a memory in a DPU/DSLAM, by a management system, or any combination thereof. Because G.fast uses time-division duplexing technology, the crosstalk event from various VDSLs has the same impact on the downstream and upstream channels. Therefore, only the plurality of loop diagnostic metric data and the loop diagnostic metric simulation graph corresponding to one of the downstream and upstream channels are needed. The method involves a scan of the loop diagnostic metric data using a scan index Si. The loop diagnostic metric datum and the loop diagnostic metric simulation graph are functions of the scan index Si. Because data are modulated using discrete multitone (DMT) modulation in G.fast, there are 2048 subcarriers (i.e. 2048 tones, where each tone has a sequential index) for the 106 MHz profile and 4096 subcarriers for the 212 MHz profile. The spacing between adjacent subcarriers is 51.75 kHz. In one preferred embodiment, the subcarrier index is used as the scan index Si. The scan starts from a higher subcarrier index (corresponding to a higher frequency), and moves sequentially down to a lower subcarrier index (corresponding to a lower frequency). In step 302, a start point for the scan is set. The start point corresponds to a subcarrier having a frequency being the sum of a maximum VDSL frequency causing crosstalk and a guard band. Adding the guard band can prevent an incorrect result due to intersymbol interference (ISI). In one embodiment, the maximum VDSL frequency is 30 MHz, which is the bandwidth (highest frequency) of 30a VDSL that has the largest bandwidth among all the profiles. With the maximum VDSL frequency, the frequency ranges for all the profiles of VDSL are scanned. The guard band is approximately 2 MHz. Therefore, the start point corresponds to approximately 30 MHz+2 MHz=32 MHz and to subcarrier index 618 in G.fast. Through real measurements, it can be confirmed that this start point can prevent an incorrect result due to ISI. The scan is now ready to begin with a start scan index. In the embodiment mentioned above, the start scan index Si=618.

In step 303, it is determined if the loop diagnostic metric datum corresponding to Si complies with a degradation criterion of communication data flow quality, wherein the degradation criterion of communication data flow quality is established based on sudden degradation resulting in at least one of a non-sustained link and a packet loss. In one embodiment, it is determined by comparing the loop diagnostic metric datum and the graph point of a loop diagnostic metric simulation graph corresponding to Si to obtain a difference. The degradation criterion of communication data flow quality provides a minimum difference. When the difference is greater or equal to the minimum difference, at least one of a non-sustained link and a packet loss occurs, resulting in a "yes" result for step 303. In another embodiment, it is determined by comparing the loop diagnostic metric datum corresponding to the current Si and the loop diagnostic metric datum corresponding to the previous Si (i.e., current Si+1, cf. step 305) to obtain a difference. The degradation criterion of communication data flow quality provides a second minimum difference. When the difference is greater or equal to the second minimum difference, at least one of a non-sustained link and a packet loss occurs, resulting in a "yes" result for step 303. The two embodiments may be combined in step 303. If the result for step 303 is "yes", a start frequency of the communication loop in the transmission line is determined based on Si and the scanning step is stopped (step 304). If the result for step 303 is "no", then proceed to step 305. In step 305, let Si=Si−1.

From step 305 proceed to step 306. In step 306, it is determined if Si corresponds to a subcarrier having a frequency greater than a minimum frequency. In one embodiment, the minimum frequency is 2.2 MHz, corresponding to subcarrier index 43 in G.fast. If Si>43, the result for step 306 is "yes" and the next step is again step 303. If the result is "no", then proceed to step 304.

Once the start frequency of the communication loop in the transmission line is automatically determined in step 304, the start frequency in the transmission line can be set without manual operation. Next, the running mode of the transmission line can be entered, and related information can be reported to a management system or an operator (step 307). The related information includes the communication loop (e.g. the specific port of DPU/DSLAM equipment), the loop diagnostic metric data, the loop diagnostic metric simulation graph and the start frequency in the transmission line. In step 308, it is determined if run time noise appears. If the result is "yes", then proceed to step 309; if the result is "no", then return to step 308. In step 309, a run time dynamic bit swap of the transmission line is performed utilizing the functions of the transmission line, e.g., FRA and SRA in the G.fast system, and information of the run time dynamic bit swap is reported to the management system or the operator. In step 310, it is determined if a non-sustained link of the transmission line appears. If the result is "yes", then return to step 300 to restart; if the result is "no", then return to step 308.

Figure 4:
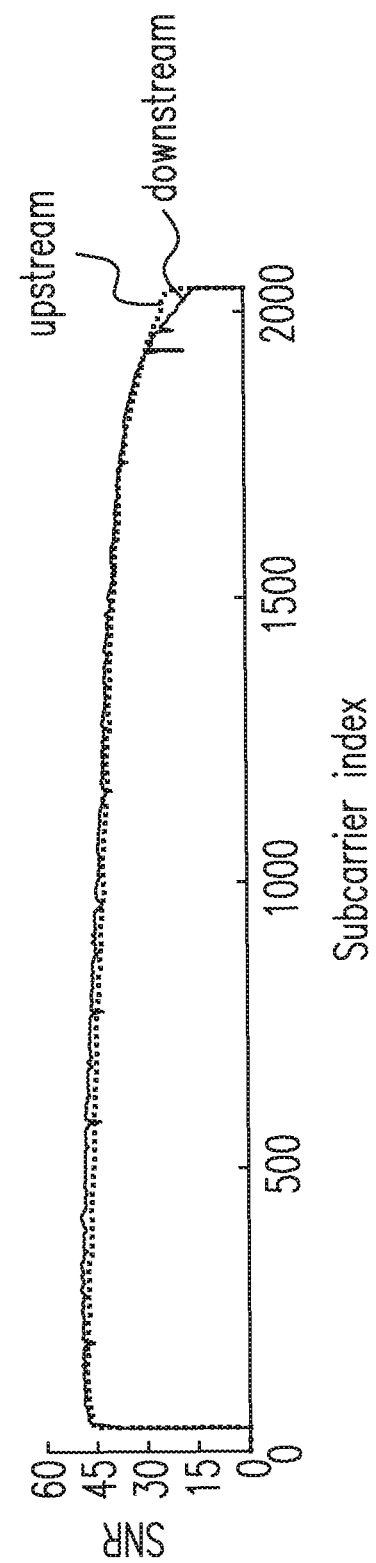
FIG. 4 shows an example of loop diagnostic metric data in the absence of VDSL, where the loop diagnostic metric data are signal-to-noise ratios (SNR)

Please refer to FIG. 4, which shows an example of loop diagnostic metric data in the absence of VDSL, where the loop diagnostic metric data are signal-to-noise ratios (SNR). The G.fast frequency range in FIG. 4 is from 2.2 MHz (subcarrier index 43) to 106 MHz (subcarrier index 2047). In the test environment for FIGS. 4-7, the length of the bundle of wires is 50 m, the bundle of wires includes 50 pairs of copper wires and 28 symbol periods are dedicated for downstream transmission (i.e., $M_{ds}$=28, see ITU-T G.9701).

Figure 5:
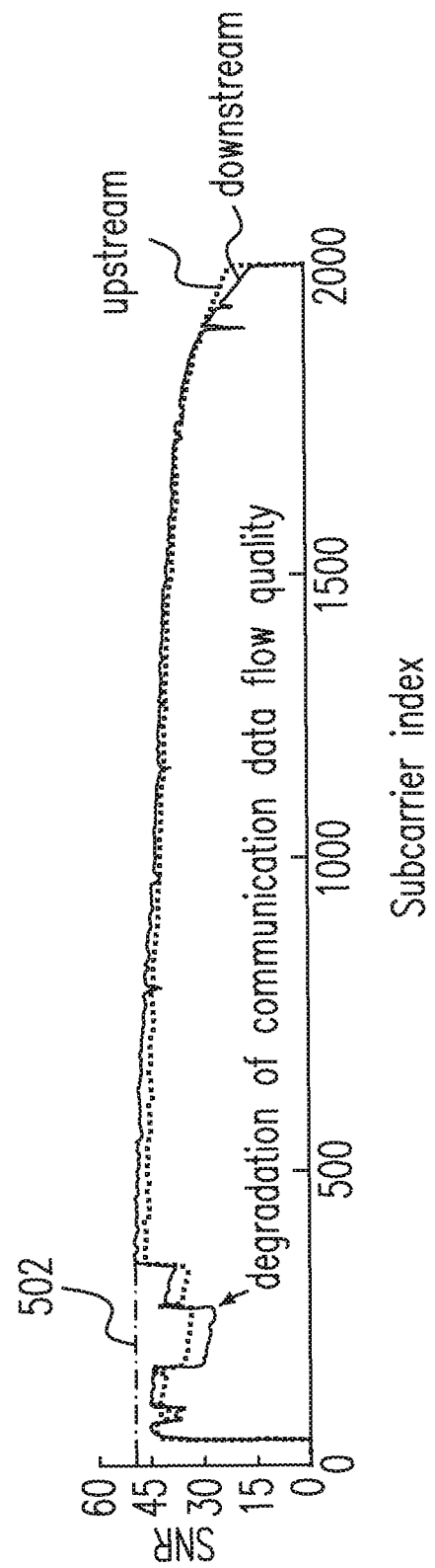
FIG. 5 shows an example of loop diagnostic metric data when there is crosstalk between VDSL and G.fast, where the loop diagnostic metric data are signal-to-noise ratios (SNR)

Please refer to FIG. 5, which shows an example of loop diagnostic metric data when there is crosstalk between VDSL and G.fast, where the loop diagnostic metric data are signal-to-noise ratios (SNR). The G.fast frequency range in FIG. 5 is from 2.2 MHz (subcarrier index 43) to 106 MHz (subcarrier index 2047). Comparing the loop diagnostic metric data with the loop diagnostic metric simulation graph 502, it can be seen that degradation of communication data flow quality occurs between subcarrier index 43 and subcarrier index 328.

Figure 6:
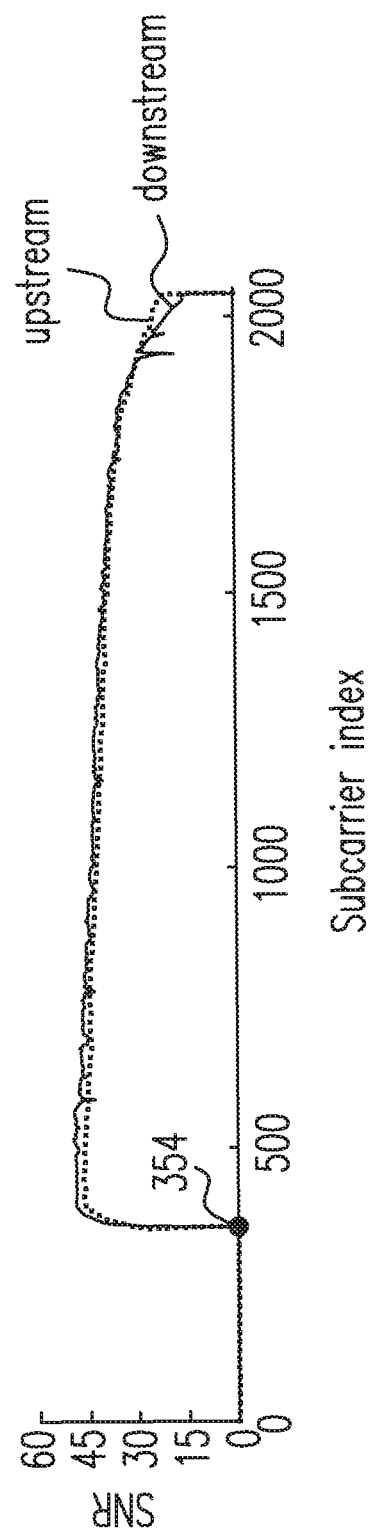
FIG. 6 shows an example of loop diagnostic metric data after the start frequency in the G.fast system is set using the method of the present invention which automatically removes crosstalk between 17a VDSL and G.fast, where the loop diagnostic metric data are signal-to-noise ratios (SNR)

FIG. 6 shows an example of loop diagnostic metric data after the start frequency in the G.fast system is set using the method of the present invention which automatically removes crosstalk between 17*a* VDSL and G.fast, where the loop diagnostic metric data are signal-to-noise ratios (SNR). The G.fast frequency range in FIG. 6 is from 2.2 MHz (subcarrier index 43) to 106 MHz (subcarrier index 2047). Because degradation of communication data flow quality occurs between subcarrier index 43 and subcarrier index 353, the start frequency in the G.fast system set by the method of the present invention corresponds to subcarrier index 354.

Figure 7:
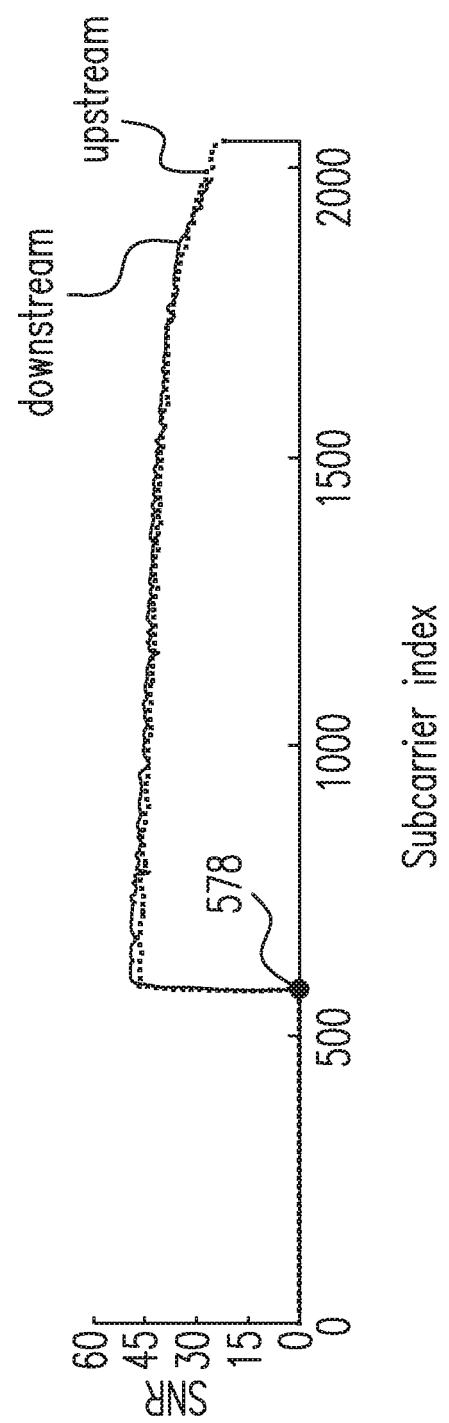
FIG. 7 shows an example of loop diagnostic metric data after the start frequency in the G.fast system is set using the method of the present invention which automatically removes crosstalk between 30a VDSL and G.fast, where the loop diagnostic metric data are signal-to-noise ratios (SNR).

FIG. 7 shows an example of loop diagnostic metric data after the start frequency in the G.fast system is set using the method of the present invention which automatically removes crosstalk between 30*a* VDSL and G.fast, where the loop diagnostic metric data are signal-to-noise ratios (SNR). Because degradation of communication data flow quality occurs between subcarrier index 43 and subcarrier index 577, the start frequency in the G.fast system set by the method of the present invention corresponds to subcarrier index 578.

Embodiments:

1. A method to automatically remove a crosstalk between a very-high-bit-rate digital subscriber line (VDSL) and a G.fast system on a bundle of wires, comprising:
    measuring a plurality of loop diagnostic metric data related to a communication loop connected between a G.fast distribution point unit (DPU)/digital subscriber line access multiplexer (DSLAM) equipment and a G.fast customer premises equipment (CPE) by the G.fast DPU/DSLAM equipment;
    simulating a loop diagnostic metric simulation graph having plural graph points and related to the communication loop in an absence of the VDSL;
    setting a start point for scanning the loop diagnostic metric data, wherein the start point has a start scan index corresponding to a first G.fast subcarrier having a frequency being a sum of a maximum VDSL frequency causing the crosstalk and a guard band;
    scanning at a plurality of scan points from the start point down to a stop point having a stop scan index corresponding to a second G.fast subcarrier, wherein the second G.fast subcarrier has a minimum G.fast frequency, the plurality of scan points including the start point and the stop point have a plurality of scan indexes including the start scan index and the stop scan index and corresponding to a plurality of G.fast subcarriers including the first and the second subcarriers, and a specific one of the loop diagnostic metric data corresponds to a specific one of the plural graph points and a specific one of the plural graph points corresponds to a specific one of the plurality of subcarriers;
    comparing the specific one of the loop diagnostic metric data and the specific graph point corresponding to the specific subcarrier to obtain a difference; and
    when the difference complies with a degradation criterion of communication data flow quality, determining a start frequency of the communication loop in the G.fast system based on the specific scan index and stopping the scanning step, wherein the degradation criterion of communication data flow quality is established based on a sudden degradation resulting in at least one of a non-sustained link and a packet loss in a specific G.fast subcarrier having the specific scan index.
2. The method according to Embodiment 1, wherein each of the plurality of loop diagnostic metric data is one being selected from a group consisting of a signal-to-noise ratio, a quiet line noise, an HLog and a combination thereof.
3. The method according to Embodiment 1 or 2, wherein the plurality of loop diagnostic metric data and the loop diagnostic metric simulation graph correspond to one of a downstream channel and an upstream channel.
4. The method according to any one of Embodiments 1-3, wherein the maximum VDSL frequency is a maximum bandwidth of the VDSL.
5. The method according to any one of Embodiments 1-4, further comprising: determining a G.fast run time dynamic bit swap by a fast rate adaptation (FRA) and a seamless rate adaptation (SRA) to handle a run time noise.
6. The method according to any one of Embodiments 1-5, wherein the plurality of loop diagnostic metric data, the start frequency and the G.fast run time dynamic bit swap are saved to a data storage module.
7. A method of operating an access equipment, comprising:
    obtaining a plurality of loop diagnostic metric data related to a communication loop connected between a customer premises equipment (CPE) and one of the access equipment and another access equipment; and removing a crosstalk between a very-high-bit-rate digital subscriber line (VDSL) and a transmission line on a bundle of wires, wherein the transmission line transmits a signal using a plurality of subcarriers including a first subcarrier having a minimum frequency, and the removing step further includes:

setting a start point for scanning the loop diagnostic metric data, wherein the start point has a start scan index corresponding to a second subcarrier having a frequency being a sum of a maximum VDSL frequency causing the crosstalk and a guard band;

scanning at a plurality of scan points from the start point down to a stop point having a stop scan index corresponding to the first subcarrier, wherein the plurality of scan points including the start point and the stop point have a plurality of scan indexes including the start scan index and the stop scan index and corresponding to the plurality of subcarriers including the first and the second subcarriers; and when a specific one of the loop diagnostic metric data complies with a degradation criterion of communication data flow quality, determining a start frequency of the communication loop in the transmission line based on a specific one of the scan indexes and stopping the scanning step, wherein the degradation criterion of communication data flow quality is established based on a sudden degradation resulting in at least one of a non-sustained link and a packet loss in a specific subcarrier having the specific scan index.

8. An access equipment, comprising:
a crosstalk removal module removing a crosstalk between a very-high-bit-rate digital subscriber line (VDSL) and a transmission line, wherein the transmission line transmits a signal using a plurality of subcarriers including a first subcarrier having a minimum frequency; and
a processor, wherein the processor executes the crosstalk removal module and performs steps of:

setting a start point for scanning a plurality of loop diagnostic metric data related to a communication loop, wherein the communication loop is connected between a customer premises equipment (CPE) and one of the access equipment and another access equipment, the start point has a start scan index corresponding to a second subcarrier having a frequency being a sum of a maximum VDSL frequency causing the crosstalk and a guard band;

scanning at a plurality of scan points from the start point down to a stop point having a stop scan index corresponding to the first subcarrier, wherein the plurality of scan points including the start point and the stop point have a plurality of scan indexes including the start scan index and the stop scan index and corresponding to the plurality of subcarriers including the first and the second subcarriers; and when a specific one of the loop diagnostic metric data complies with a degradation criterion of communication data flow quality, determining a start frequency of the communication loop in the transmission line based on a specific one of the scan indexes and stopping the scanning step, wherein the degradation criterion of communication data flow quality is established based on a sudden degradation resulting in at least one of a non-sustained link and a packet loss in a specific subcarrier having the specific scan index.

9. The access equipment according to Embodiment 8, wherein the access equipment is one of a distribution point unit (DPU)/digital subscriber line access multiplexer (DSLAM) equipment and a management system.

10. The access equipment according to Embodiment 8 or 9, wherein the crosstalk removal module is included in a memory.

11. The access equipment according to any one of Embodiments 8-10, wherein the transmission line is a G.fast system.

12. The access equipment according to any one of Embodiments 8-11, wherein the loop diagnostic metric data is one being selected from a group consisting of a signal-to-noise ratio, a quiet line noise, an HLog and a combination thereof.

13. The access equipment according to any one of Embodiments 8-12, wherein the maximum VDSL frequency is a maximum bandwidth of the VDSL.

14. The access equipment according to any one of Embodiments 8-13, wherein the processor further performs steps of:

simulating a loop diagnostic metric simulation graph having plural graph points and related to the communication loop in an absence of the VDSL, wherein a specific one of the loop diagnostic metric data corresponds to a specific one of the plural graph points and a specific one of the plural graph points corresponds to a specific one of the plurality of subcarriers; and comparing the specific one of the loop diagnostic metric data and the specific graph point corresponding to the specific subcarrier to obtain a difference so as to determine whether the difference complies with the degradation criterion of communication data flow quality.

15. The access equipment according to any one of Embodiments 8-14, wherein the loop diagnostic metric data and the loop diagnostic metric simulation graph correspond to one of a downstream channel and an upstream channel.

16. The access equipment according to any one of Embodiments 8-15, wherein the processor further performs a step of: determining a G.fast run time dynamic bit swap by a fast rate adaptation (FRA) and a seamless rate adaptation (SRA) to handle a run time noise.

17. The access equipment according to any one of Embodiments 8-16, further comprising a data storage module, wherein the access equipment is a distribution point unit (DPU)/digital subscriber line access multiplexer (DSLAM) equipment, and the loop diagnostic metric data, the start frequency and the G.fast run time dynamic bit swap are saved to the data storage module.

18. The access equipment according to any one of Embodiments 8-17, wherein the crosstalk removal module and the data storage module are included in a memory.

19. The access equipment according to any one of Embodiments 8-18, wherein the memory further includes a data retrieval module.

20. The access equipment according to any one of Embodiments 8-19, wherein the access equipment is a management system, and the memory further includes a data collection module and an alert generation module.

It can be seen from the above description that the method for automatically removing crosstalk disclosed in the present invention can be implemented by various units of access equipment, can eliminate unnecessary manual operations, and can utilize abilities that human beings lack to more reliably determine the start frequency of the communication loop in the transmission line, and then to automatically set the start frequency in the transmission line and remove crosstalk interference between VDSL and the transmission line. For example, for a G.fast system, the present invention allows the time required to complete the setting of the start frequency corresponding to each port of a unit of DPU/DSLAM equipment and the related work therefor to be reduced to less than 2 minutes. Therefore, the installation time is greatly reduced, human errors are also reduced, and the installation can be done correctly by ordinary technicians, which is advantageous to the promotion of G.fast systems. Thus, the present invention has significant practical applications.

It is contemplated that modifications and combinations will readily occur to those skilled in the art, and these modifications and combinations are within the spirit of this invention.

What is claimed is:

1. A method to automatically remove a crosstalk between a very-high-bit-rate digital subscriber line (VDSL) and a G.fast system on a bundle of wires, by means of a processor executing instructions stored in a memory device, the method comprising the steps of:
    measuring a plurality of loop diagnostic metric data related to a communication loop connected between a G.fast distribution point unit (DPU)/digital subscriber line access multiplexer (DSLAM) equipment and a G.fast customer premises equipment (CPE) by the G.fast DPU/DSLAM equipment;
    simulating a loop diagnostic metric simulation graph having plural graph points and related to the communication loop in an absence of the VDSL;
    setting a start point for scanning the plurality of loop diagnostic metric data, wherein the start point has a start scan index corresponding to a first G.fast subcarrier having a frequency being a sum of a maximum VDSL frequency causing the crosstalk and a guard band;
    scanning at a plurality of scan points from the start point down to a stop point having a stop scan index corresponding to a second G.fast subcarrier, wherein the second G.fast subcarrier has a minimum G.fast frequency, the plurality of scan points including the start point and the stop point having a plurality of scan indexes including the start scan index and the stop scan index and corresponding to a plurality of G.fast subcarriers including the first and the second subcarriers, and a specific one of the loop diagnostic metric data corresponding to a specific one of the plural graph points and a specific one of the plural graph points corresponding to a specific one of the plurality of subcarriers;
    comparing the specific one of the loop diagnostic metric data and the specific graph point corresponding to the specific subcarrier to obtain a difference;
    when the difference complies with a degradation criterion of communication data flow quality, determining a start frequency of the communication loop in the G.fast system based on the specific scan index and stopping the scanning step, wherein the degradation criterion of communication data flow quality is established based on a sudden degradation resulting in at least one of a non-sustained link and a packet loss in a specific G.fast subcarrier having the specific scan index; and
    setting the start frequency of the communication loop in the G.fast system so that a frequency range of the G.fast system lies outside a frequency range of the VDSL to remove the crosstalk.

2. The method as claimed in claim 1, wherein each of the plurality of loop diagnostic metric data is one being selected from a group consisting of a signal-to-noise ratio, a quiet line noise, an HLog and a combination thereof.

3. The method as claimed in claim 1, wherein the plurality of loop diagnostic metric data and the loop diagnostic metric simulation graph correspond to one of a downstream channel and an upstream channel.

4. The method as claimed in claim 1, wherein the maximum VDSL frequency is a maximum bandwidth of the VDSL.

5. The method as claimed in claim 1, further comprising the step of: determining a G.fast run time dynamic bit swap by a fast rate adaptation (FRA) and a seamless rate adaptation (SRA) to handle a run time noise.

6. The method as claimed in claim 5, wherein the plurality of loop diagnostic metric data, the start frequency and the G.fast run time dynamic bit swap are saved to a data storage module.

7. A method performed by an access equipment, comprising the steps of:
    obtaining a plurality of loop diagnostic metric data related to a communication loop connected between a customer premises equipment (CPE) and one of the access equipment and another access equipment; and
    removing a crosstalk between a very-high-bit-rate digital subscriber line (VDSL) and a transmission line on a bundle of wires, wherein the transmission line transmits a signal using a plurality of subcarriers including a first subcarrier having a minimum frequency, and the removing of the crosstalk further includes:
    setting a start point for scanning the plurality of loop diagnostic metric data, wherein the start point has a start scan index corresponding to a second subcarrier having a frequency being a sum of a maximum VDSL frequency causing the crosstalk and a guard band;
    scanning at a plurality of scan points from the start point down to a stop point having a stop scan index corresponding to the first subcarrier, wherein the plurality of scan points including the start point and the stop point have a plurality of scan indexes including the start scan index and the stop scan index and corresponding to the plurality of subcarriers including the first and the second subcarriers;
    when a specific one of the loop diagnostic metric data complies with a degradation criterion of communication data flow quality, determining a start frequency of the communication loop in the transmission line based on a specific one of the scan indexes and stopping the scanning step, wherein the degradation criterion of communication data flow quality is established based on a sudden degradation resulting in at least one of a non-sustained link and a packet loss in a specific subcarrier having the specific scan index; and
    setting the start frequency of the communication loop in the transmission line so that a frequency range of the transmission line lies outside a frequency range of the VDSL to remove the crosstalk.

8. An access equipment, comprising:
    a crosstalk removal module for removing a crosstalk between a very-high-bit-rate digital subscriber line (VDSL) and a transmission line, wherein the transmission line transmits a signal using a plurality of subcarriers including a first subcarrier having a minimum frequency; and
    a processor, wherein the processor executes the crosstalk removal module and performs steps of:

setting a start point for scanning a plurality of loop diagnostic metric data related to a communication loop, wherein the communication loop is connected between a customer premises equipment (CPE) and one of access equipment and another access equipment, the start point has a start scan index corresponding to a second subcarrier having a frequency being a sum of a maximum VDSL frequency causing the crosstalk and a guard band;

scanning at a plurality of scan points from the start point down to a stop point having a stop scan index corresponding to the first subcarrier, wherein the plurality of scan points including the start point and the stop point have a plurality of scan indexes including the start scan index and the stop scan index and corresponding to the plurality of subcarriers including the first and the second subcarriers;

when a specific one of the loop diagnostic metric data complies with a degradation criterion of communication data flow quality, determining a start frequency of the communication loop in the transmission line based on a specific one of the scan indexes and stopping the scanning step, wherein the degradation criterion of communication data flow quality is established based on a sudden degradation resulting in at least one of a non-sustained link and a packet loss in a specific subcarrier having the specific scan index; and setting the start frequency of the communication loop in the transmission line so that a frequency range of the transmission line lies outside a frequency range of the VDSL to remove the crosstalk.

9. The access equipment as claimed in claim 8, wherein the access equipment is one of a distribution point unit (DPU)/digital subscriber line access multiplexer (DSLAM) equipment and a management system.

10. The access equipment as claimed in claim 8, wherein the crosstalk removal module is included in a memory.

11. The access equipment as claimed in claim 8, wherein the transmission line is a G.fast system.

12. The access equipment as claimed in claim 8, wherein the loop diagnostic metric data is one being selected from a group consisting of a signal-to-noise ratio, a quiet line noise, an HLog and a combination thereof.

13. The access equipment as claimed in claim 8, wherein the maximum VDSL frequency is a maximum bandwidth of the VDSL.

14. The access equipment as claimed in claim 8, wherein the processor further performs steps of:

simulating a loop diagnostic metric simulation graph having plural graph points and related to the communication loop in an absence of the VDSL, wherein a specific one of the loop diagnostic metric data corresponds to a specific one of the plural graph points and a specific one of the plural graph points corresponds to a specific one of the plurality of subcarriers; and comparing the specific one of the loop diagnostic metric data and the specific graph point corresponding to the specific subcarrier to obtain a difference so as to determine whether the difference complies with the degradation criterion of communication data flow quality.

15. The access equipment as claimed in claim 13, wherein the loop diagnostic metric data and the loop diagnostic metric simulation graph correspond to one of a downstream channel and an upstream channel.

16. The access equipment as claimed in claim 11, wherein the processor further performs a step of: determining a G.fast run time dynamic bit swap by a fast rate adaptation (FRA) and a seamless rate adaptation (SRA) to handle a run time noise.

17. The access equipment as claimed in claim 16, further comprising a data storage module, wherein the access equipment is a distribution point unit (DPU)/digital subscriber line access multiplexer (DSLAM) equipment, and the loop diagnostic metric data, the start frequency and the G.fast run time dynamic bit swap are saved to the data storage module.

18. The access equipment as claimed in claim 17, wherein the crosstalk removal module and the data storage module are included in a memory.

19. The access equipment as claimed in claim 18, wherein the memory further includes a data retrieval module.

20. The access equipment as claimed in claim 10, wherein the access equipment is a management system, and the memory further includes a data collection module and an alert generation module.

* * * * *